United States Patent [19]
Robinson

[11] Patent Number: 5,922,061
[45] Date of Patent: *Jul. 13, 1999

[54] METHODS AND APPARATUS FOR IMPLEMENTING HIGH SPEED DATA COMMUNICATIONS

[75] Inventor: Jeffrey I. Robinson, New Fairfield, Conn.

[73] Assignee: IQ Systems, Newtown, Conn.

[*] Notice: This patent is subject to a terminal disclaimer.

[21] Appl. No.: 08/645,262

[22] Filed: May 13, 1996

Related U.S. Application Data

[63] Continuation-in-part of application No. 08/545,881, Oct. 20, 1995, Pat. No. 5,687,326.

[51] Int. Cl.⁶ .................................................. G06F 13/14
[52] U.S. Cl. ................................................................ 710/109
[58] Field of Search ................................ 395/280, 287, 395/285, 286, 865, 866, 862, 289, 117; 710/100, 105, 106, 107, 109, 112, 124, 45, 46

[56] References Cited

U.S. PATENT DOCUMENTS

| | | | |
|---|---|---|---|
| 4,050,097 | 9/1977 | Miu et al. | 364/200 |
| 4,200,936 | 4/1980 | Borzcik et al. | 364/900 |
| 4,310,896 | 1/1982 | Cutler et al. | 395/285 |
| 4,357,658 | 11/1982 | van der Ouderaa | 364/200 |
| 4,488,226 | 12/1984 | Wagner, Jr. et al. | 364/200 |
| 5,276,807 | 1/1994 | Kodama et al. | 395/200 |
| 5,361,376 | 11/1994 | Cummins et al. | 395/800 |
| 5,410,723 | 4/1995 | Schmidt et al. | 395/800 |

*Primary Examiner*—Glenn A. Auve
*Assistant Examiner*—Xuong Chung-Trans
*Attorney, Agent, or Firm*—David P. Gordon; David S. Jacobson; Tahomas A. Gallagher

[57] ABSTRACT

A self-timed high speed data communications system includes an N-bit wide data path and a three-bit wide event path. Six states of the event path are used to indicate when data is on the data path for reading and when the data path is available for transmission of data. In a presently preferred embodiment, the event path has three stable states and three meta-stable states. The initial state of the event path is a first stable state. When a user places data on the data path, the event path assumes a first meta-stable state. After the data is read by all users, the event path assumes a second stable state. Further transmission and reception of data cycles the event path through alternating meta-stable and stable states. The event path is preferably zero dominant (one recessive) and stable states are indicated when only one of the three bits are asserted by all users. Meta-stable states are indicated when a transmitting user asserts one bit of the event path and at least one other users asserts another bit of the event path. Acknowledgement of data reception by each user is signalled by the user de-asserting a bit of the event path. Both wired and wireless communications systems are disclosed. Several wireless signalling systems include coherent and non-coherent systems, FSK systems and pulse keyed systems. Apparatus for the wired and wireless systems are also disclosed. Efficient software implementation of the invention is also disclosed.

17 Claims, 7 Drawing Sheets

METHODS AND APPARATUS FOR IMPLEMENTING HIGH SPEED DATA COMMUNICATIONS

This application is a continuation-in-part of application Ser. No. 08/545,881 now U.S. Pat. No. 5,637,326, filed Oct. 20, 1995, the complete disclosure of which is hereby incorporated by reference herein.

BACKGROUND OF THE INVENTION

1. Field of the Invention

The invention relates to methods and apparatus for the transfer of binary data among digital devices. More particularly, the invention relates to self-timed data communications systems and methods.

2. State of the Art

Known communications bus techniques are all based on a clock pulse data scheme. These techniques may provide clock and data signals on separate lines or provide a data signal which is encoded with clock information. Alternatively, data may be transmitted asynchronously with a clock signal being generated locally by the receiver. All techniques, however, require that the receiver view data at a specific instant in time, i.e. at the clock edge.

Many microprocessors are provided with integral (dedicated) serial data ports. However, in many applications, additional serial ports are required. The additional ports can be effected through additional external circuitry or the logic of the port can be implemented in the processor using software and any free I/O pin(s) of the processor. While the reading of serial data at specific instances is not a significant problem for dedicated devices, it poses difficult problems for software implementation in the logic of a microprocessor.

Virtually all microprocessors are required to service a number of independent tasks in an apparently concurrent manner. This is sometimes referred to as multi-tasking or multi-threading. In reality, a microprocessor can only operate on one task at a time and multi-tasking is accomplished by programming the microprocessor to switch between or among different tasks very rapidly so that there is an appearance of concurrent task processing. The switching among different tasks is most often in response to external events (e.g. the press of a key on a keyboard) which are random in nature. Therefore, it is problematic to program the microprocessor so that it is always available at the instance of a clock transition to read serially transmitted data. This problem is usually solved in one of two ways: through the use of polling, or through the use of interrupts.

In polling, the microprocessor repeatedly reads an I/O pin through which the clock signal is received to determine if it has changed state. Since the data must be read at an exact instance of clock signal transition, the microprocessor must poll the I/O pin at a rate which is significantly faster than the frequency of the clock signal. If the microprocessor misses a clock transition data will be lost. Serial communications clock signals are typically in the tens or hundreds of kilohertz. Therefore, the microprocessor must devote a significant number of its cycles to the task of polling the clock signal.

The use of interrupts is similar to polling but utilizes additional hardware (e.g. a separate interrupt pin, internal timers, etc.) in order to enable more efficient software. While the use of interrupts relieves the processor of some of the time wasted during polling, it still interferes with the fundamental operation of the processor, and considerable time must be spent by programmers ensuring that the scheduling of interrupts does not cause other parts of the software to malfunction. As the rate of serial data transfer increases, the challenge in scheduling interrupts becomes progressively more difficult.

Therefore, while soft implementation of a serial port in a microprocessor is known and is widely used, the hard timing of serial data communications complicates the design of system software and places unwanted constraints on the processor.

Parent application Ser. No. 08/545,881 discloses a self-timed point-to-point serial data link and a self-timed multi-user serial data bus. The point-to-point link allows two processors to communicate via one, two, or three lines in which data and timing information are transmitted simultaneously. In the two line embodiment, the link has four possible states: 11, 10, 00, and 01. The idle state of the bus is 11 which is shown at t0 in FIG. 1. When a first processor transmits a binary ZERO at t1, the first processor pulls the ZERO line low and the state of the bus is changed to 10. Sensing the change in the bus state the second processor acknowledges by pulling the ONE line low at t2. The state of the bus is thus changed to 00. Sensing the change in the bus indicating acknowledgement by the second processor, the first processor releases the ZERO line at t3 which changes the state of the bus to 01. Upon sensing the change in the bus, the second processor ceases acknowledgement at t4, releases the ONE line, and returns the bust the state 11. The transmission of a binary ONE follows a similar procedure, but the states of the bus cycle in the opposite direction, i.e. from 11 to 01 to 00 to 10 and back to 11. As shown in FIG. 1, one of the processors transmits a binary ONE at t5 and the other processor acknowledges by asserting the ZERO line at t6. The transmitting processor ceases transmitting at t7 and the acknowledging processor ceases acknowledgment at t8.

The multi-user bus described in the parent application allows an unlimited number of processors to communicate via three lines coupled to any three I/O pins of each processor. Since the multi-user bus uses three lines, the bus has eight possible states. FIG. 2 is timing diagram of the multi-user bus and FIG. 3 is a state diagram of the bus. The initial state of the bus is illustrated at time t0 in FIG. 2 where line 0 functions as the ZERO data line (D0), line 1 functions as the ONE data line (D1), and line 2 functions as the acknowledge line (ACK). In this initial state, the data lines D0 and D1 are pulled high (unasserted) and the acknowledge line ACK is pulled low by all the bus users.

The transmission of a Binary ZERO by a bus user is effected by asserting the D0 line and the transmission of a Binary ONE is effected by asserting the D1 line. In the initial state of the bus, therefore, the transmission of a Binary ZERO by a transmitting bus user is effected by asserting line 0 as shown at time t1 in FIG. 2. In response to the transmission of a Binary ZERO, all receiving bus users also assert the D0 line and also release the ACK line. It will be understood, however, that since the ACK line is initially pulled low by all of the bus users, it will not go high until all receiving bus users have released the ACK line. The transmitting bus user releases the ACK line at the start of transmission. When acknowledgement has been noted by all of the bus users, the ACK line goes high as shown at time t2 in FIG. 2. After releasing the ACK line, the function of each of the physical lines line 0, line 1, and line 2 rotates so that the lines which are now high (line 2 and line 3) become the data lines (D0 and D1 respectively) and the line which is now low (line 0) becomes the acknowledgement line (ACK). This state of the bus is shown in FIG. 2 during the time between t2 and t3. A next Binary ZERO transmission, will therefore be effected by asserting line 1, as shown in FIG. 2 at time t3, since line 1 now functions as the D0 line. Acknowledgement by all bus users will result in line 0 going high, as shown in FIG. 2 at time t4, since line 0 now functions as the ACK line. Following the acknowledgement at time t4, the function of each of the physical lines line 0, line 1, and line 2 rotates so that the lines which are now high (line 2 and line 0) become the data lines (D0 and D1 respectively) and the line which is now low (line 1) becomes the acknowledgement line (ACK). This state of the bus is shown in FIG. 2 during the time between t4 and t5. As described thus far, following each Binary ZERO transmission and acknowledgement, the function of each physical line is rotated clockwise or in a positive direction. For example, following the acknowledgment at t2 in FIG. 2, the function D0 is rotated from line 0 to line 1, the function D1 is rotated from line 1 to line 2, etc.

As mentioned above, the transmission of a Binary ONE is effected by asserting the D1 line, which, as described above, may be any of the physical lines depending on the state of the bus. For example, from the bus state shown between times t4 and t5, a Binary ONE is transmitted by asserting physical line 0 (which in this state has the function D1 ) as shown in FIG. 2 at time t5. The transmission of a Binary ONE is followed by each of the receiving bus users asserting the D1 line and releasing the ACK line. When all bus users have released the ACK line, as shown in FIG. 2 at time t6, the function of the physical lines is rotated so that the lines which are now high (line 1 and line 2) become the data lines (D0 and D1 respectively) and the line which is now low (line 0) becomes the acknowledgement line (ACK). It will be appreciated that the rotation of physical line functions following the acknowledgement of a Binary ONE transmission is counterclockwise or negative. For example, in the function rotation following the acknowledgement at t6 in FIG. 2, the function D0 is rotated from line 1 to line 0, the function D1 is rotated from line 2 to line 1, etc.

During the times between data transmission and full acknowledgment, e.g., between times t1 and t2, between times t3 and t4, and between times t5 and t6, the bus may be said to be "meta-stable". Bus users are prevented from transmitting new data during these meta-stable bus states. It will be understood that the meta-stable states are indicated when any two or more lines are low and at least one line is high.

It will be appreciated that each bus user in the multi-user embodiment of the invention must track the state of the bus so that each bus user knows which physical line has which function. Also, it will be appreciated that under some circumstances it will be necessary to reset the bus to its initial state where line 0 is the D0 line, line 1 is the D1 line, and where line 2 is the ACK line. The bus is reset by taking all three lines low as shown at time t7 in FIG. 2. While it is possible that any bus user could be permitted to reset the bus, it is more typical that the decision to reset the bus will be the province of a master bus user. When the bus users sense that all lines have been taken low, the functionality of the physical lines is restored to the initial state as shown at time t8 in FIG. 2.

Turning now to FIG. 3, the initial state of the bus is shown at the oval numbered 3 where the SB0 line has the D0 function, the SB1 line has the D1 function and the SBA line has the ACK function. Upon transmitting a binary ONE, the bus enters a meta-stable state shown at the hexagon numbered 1. Upon acknowledgement of the transmitted ONE by all bus users, the bus enters the stable state shown at the oval numbered 5 wherein the SB0 line has the D1 function, the SB1 line has the ACK function and the SBA line has the D0 function. From the state 5, the transmission of a binary ONE causes the bus to a meta-stable state shown at the hexagon numbered 4. Upon acknowledgement of the transmitted ONE by all bus users, the bus enters the stable state shown at the oval numbered 6 wherein the SB0 line has the ACK function, the SB1 line has the D0 function and the SBA line has the D1 function. Further transmissions of binary ONE change the state of the bus in the counterclockwise direction through the states shown in FIG. 3. From the initial state of the bus at the oval numbered 3, the transmission of a binary ZERO places the bus in a meta-stable state shown at the hexagon numbered 2. Upon acknowledgement of the transmitted ZERO by all bus users, the bus enters the stable state shown at the oval numbered 6 wherein the SB0 line has the ACK function, the SB1 line has the D0 function and the SEA line has the D1 function. Further transmissions of binary ZERO change the state of the bus in the clockwise direction through the states shown in FIG. 3.

There is a possibility that the meta-stable states of the bus may give rise to ambiguities among bus users reading the bus. In particular, during the meta-stable bus states, it is possible that some bus users could have recognized the next stable state sooner than other bus users. In a multi-user system, it is not uncommon that some users will read the bus more frequently than others. Some users may read the bus continuously. Other users may only sample the bus at regular or irregular intervals. If the state of the bus is meta-stable when a slow sampling users reads the bus, it can be ambiguous whether the state of the bus is in the same meta-stable state as the last time it was sampled or whether the bus has reached a stable state and returned to the meta-stable state during the time between the slow sampling user's samples of the bus. For example, if a slow sampling bus user recognizes a change in the bus state from state 6 to state 2 (FIG. 3), that user will release the ACK line and assume that other bus users will do the same so that the bus will move to stable state 3. Upon rereading the bus, and finding it in meta-stable state 2, once again, there is an ambiguity as to whether the bus has remained in that state rather than returned to that state (because of a transmitted zero) after achieving stable state 3.

The parent application also discloses several hardware implementations for point-to-point and multi-user buses, for example, using one, two, or three wire connections. While it is well known in the art to provide wireless data communication, or data communication which is based on a carrier where different keying methods are used to signal binary data, these carrier based communications methods also usually require a local clock or an encoded transmitted clock signal.

SUMMARY OF THE INVENTION

It is therefore an object of the invention to provide a self-timed data communications system in which meta-stable states of, the system are unambiguous to a sampling observer.

It is another object of the invention to provide a self-timed data communications system which may be implemented with a data path of any width.

It is a further object of the invention to provide methods and apparatus for implementing a self-timed high speed data communications system via a carrier based communications link.

In accord with these objects which will be discussed in detail below, the high speed-data communications system of the present invention includes an N-bit wide data path and an event path having at least three sequential stable states. According to one embodiment of the invention, the event path is a three-bit wide digital path and therefore has eight possible states. The state of the event path changes whenever data is placed on the data path and whenever all users acknowledge receipt of the data. In particular, according to one embodiment of the invention, the states of the event path are indicated by the binary numerical value of the asserted bits of the event path, e.g. 011, 101, 110, etc. Moreover, the bits of the event path are preferably "dominant zero, recessive one" bits in which each bit is asserted by pulling it low. Thus, when the third bit of the event path is asserted, the binary numerical value of the event path is 011 or decimal three. According to a presently preferred embodiment of the invention, the event path has three stable states, e.g. state three (011), state six (110), and state five (101). The state of the event path changes in one direction only, e.g. from three to six to five to three. Between stable states, the event path preferably has three meta-stable states, e.g. state two (010), state four (100), and state one (001). The meta-stable states are defined as the logical AND combination of one stable state with a next stable state. Thus, meta-stable state two is the transition state between stable states three and six because two (010) is logically equal to three (011) AND six (110). Similarly, meta-stable state four is the transition state between stable states six and five, and meta-stable state one is the transition state between stable states five and three. The remaining two states of the event path, i.e. state eight (111) and state zero (000) are used to reset the event path.

The initial state of the event path (following reset) can be any stable state such as state three in which all users assert (pull low) the third bit of the event path. From this initial state, any user placing data on the data path will assert the first bit of the event path and de-assert (release) the third bit of the event path. When the transmitting user does this, the event path is urged toward the next stable state six (110). However, since all of the other users are still asserting the third bit of the event path, the path enters a meta-stable state two (010). In this meta-stable state, users read the data on the data path and acknowledge having read the data by asserting the first bit and de-asserting the third bit of the event path. When every user has read the data and released the third bit, the event path assumes the stable state of six (110). From stable state six (110) a user placing data on the data path will assert the second bit of the event path and de-assert the first bit of the event path to urge the event path toward the stable state five (101). However, since all of the other users are asserting the first bit of the event path, the event path enters a meta-stable state four (100). In this meta-stable state, users read the data on the data path and acknowledge having read the data by asserting the second bit of the event path and de-asserting the first bit of the event path. When every user has read the data, the event path assumes the stable state of five (101). From stable state five (101), a user placing data on the data path will assert the third bit of the event path and de-assert the second bit of the event path to urge the event path toward the stable state three (011). However, since all of the other users are asserting the second bit of the event path, the event path enters a meta-stable state one (001). In this meta-stable state, users read the data on the data path and acknowledge having read the data by asserting the third bit of the event path and de-asserting the second bit of the event path. When every user has read the data, the event path assumes the stable state of three (011). Further transmission and reception of data among users cycles through these same states on the event path. Whenever the event path assumes a meta-stable state, the users are thereby signalled that data is available to be read. Whenever the event path assumes a stable state, the users are thereby signalled that the data path is available for the transmission of data. If a fast user reads the event path a second time before all users have acknowledged the last data transmission and thus finds that the event path is in the same meta-stable state as the last time that it was read, there will be no ambiguity since if new data were available on the data path, a different meta-stable state would appear on the event path.

According to another embodiment of the invention, the event path is an analog signal path and each bus user has the ability to assert three different analog signals. The state of the analog event path is determined by what analog signals are being asserted by the users. For example, when all users are asserting the first analog signal, the event path is in the first stable state. When some users are asserting the first analog signal and other users asserting the second analog signal, the event path is in the first meta-stable state. When all users are asserting the second analog signal, the event path is in the second stable state, etc.

According to another aspect of the invention, the bus systems of the parent application as well as the communication systems of the instant application are implemented via a wireless or carrier based transmission scheme. Five embodiments of carrier transmission are disclosed and include frequency modulation and amplitude modulation with and without a phase reference signal.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 4:
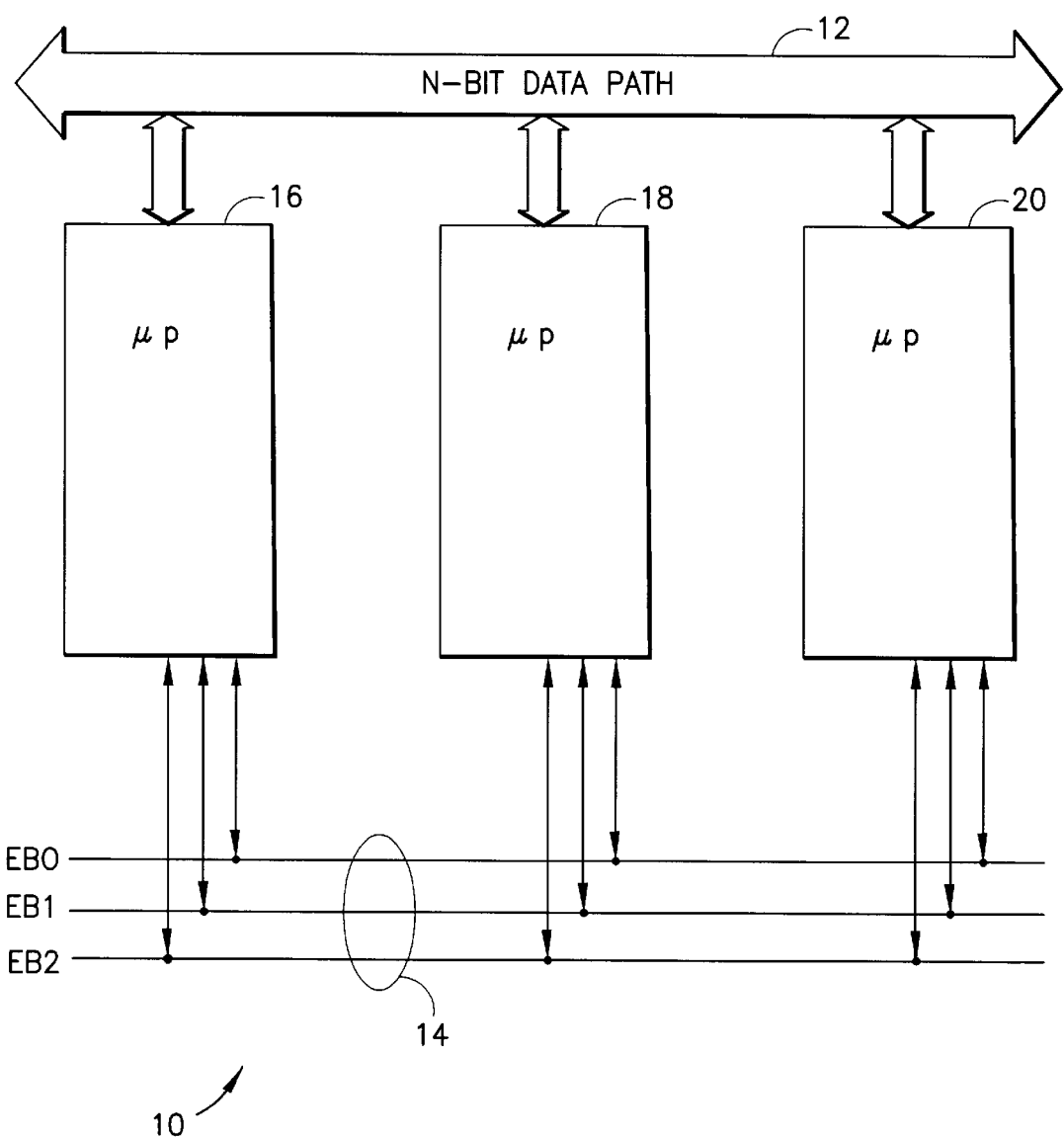
FIG. 4 is a schematic block diagram of a high speed data communication system according to the present invention.

Referring now to FIG. 4, a high speed data communications system 10 according to the invention includes an N-bit wide data path 12 and a three-bit wide event path (or state bus) 14. As shown in FIG. 4, two or more microprocessors (or users) 16, 18, 20 are bidirectionally coupled to both the data path 12 and the event path 14. According to a first embodiment of the invention, the data path 12 is embodied by at least one physical conductor and the event path 14 is embodied as three conductors EB0, EB1, and EB2. The event path 14, therefore, has eight possible states. According to the invention, six of the eight possible states are used to signal when the data path 12 is available for the transmission of data and when new data is present on the data path. The two remaining states of the event bus are used to reset the bus as described in the parent application.

Figure 5:
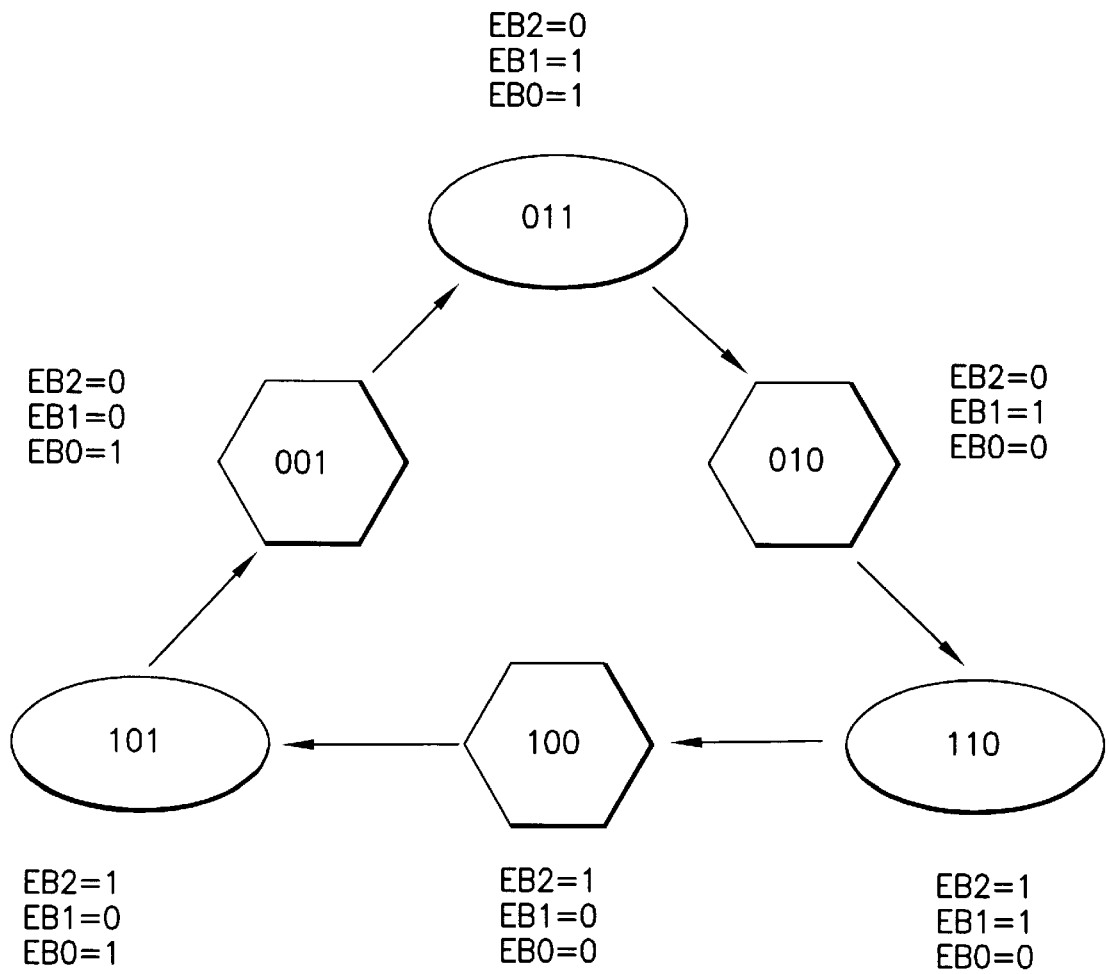
FIG. 5 is a state diagram of the event bus of FIG. 4.
Figure 6:
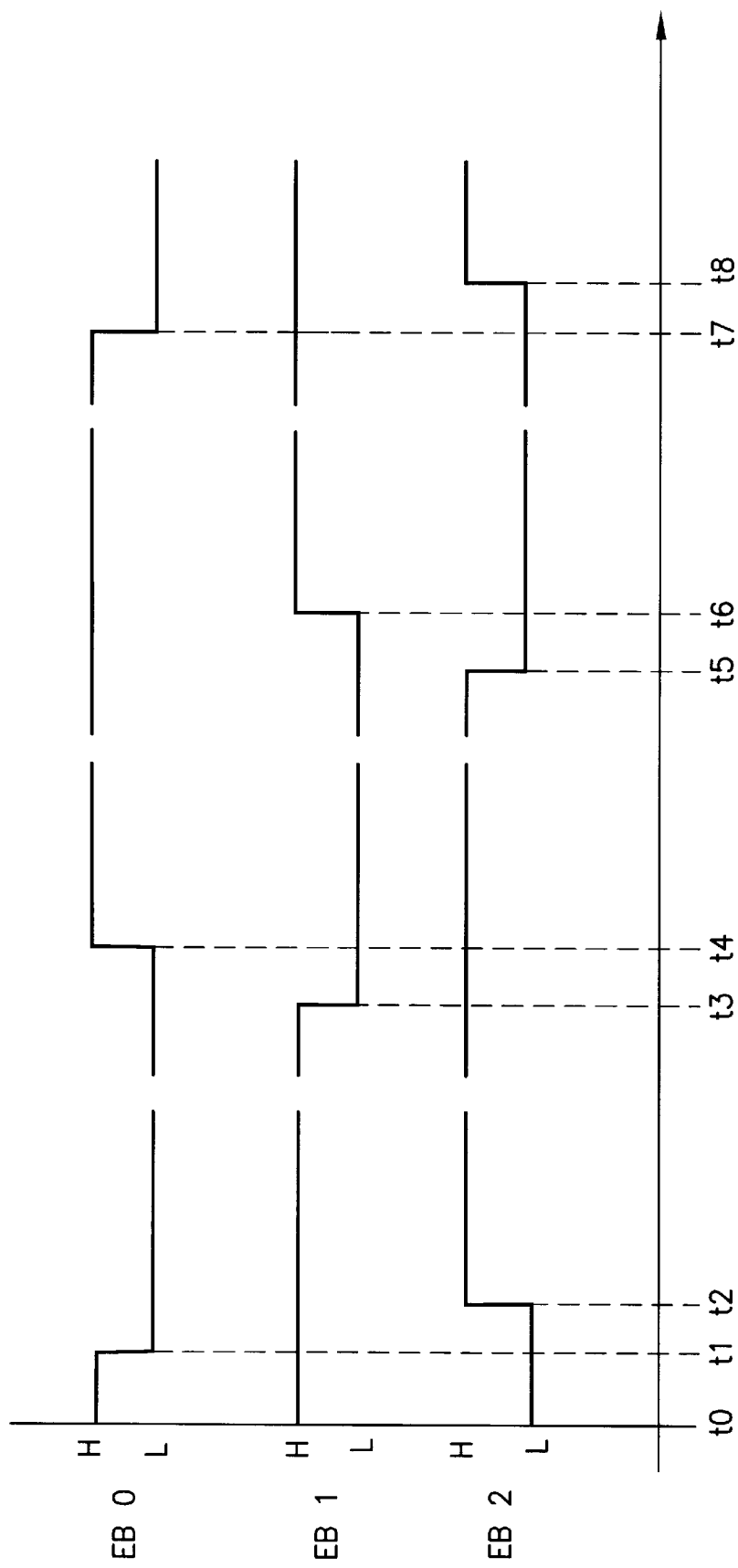
FIG. 6 is a timing diagram of the event bus of FIG. 4.

Referring now to FIGS. 5 and 6, the states of the event path are indicated by the binary numerical value of the asserted lines of the bus, e.g. 011, 101, 110, etc. Moreover, the lines of the event path are preferably "dominant zero, recessive one" lines in which each line is asserted by pulling it low (i.e., 0). Thus, when the third line EB2 of the event path is asserted, the binary numerical value of the event path is 011 or three. According to a presently preferred embodiment of the invention, the event path has three stable states, i.e. three (011), six (110), and five (101) which are shown in FIG. 5 as ovals. Between stable states, the event path has three meta-stable states, i.e. two (010), four (100), and one (001) which are shown in FIG. 5 as hexagons. The meta-stable states are defined as the logical AND combination of one stable state with a next stable state. Thus, meta-stable state two (010) is the transition state between stable states three (011) and six (110) because two (010) is logically equal to three (011) AND six (110). Similarly, meta-stable state four (100) is the transition state between stable states six (110) and five (101), and meta-stable state one (001) is the transition state between stable states five (101) and three (011).

The initial state of the event path may be any stable state such as state three (011) in which all users assert the third line EB2 of the event path. The initial state is shown in FIG. 6 at time t0. From this initial state, any user placing data on the data path, asserts the first line EB0 and de-assert the third line EB2 of the event path. When the transmitting user does this, e.g. as shown in FIG. 6 at time t1, the event path is urged toward the next stable state six (110) shown in FIG. 5. However, since all of the other users are asserting the third line EB2 of the event path, the event path enters a meta-stable state two (010). In this meta-stable state, between times t1 and t2 in FIG. 6, users read the data on the data path and acknowledge having read the data by asserting the first line EB0 and de-asserting the third line EB2 of the event path. When every user has read the data, the event path assumes the stable state of six (110) shown in FIG. 6 at time t2. From stable state six (110) a user placing data on the data path will assert the second line EB1 of the event path and de-assert the first line EB0 of the event path, shown in FIG. 6 at time t3, to urge the event path toward the next stable state five (101). However, since all of the other users are asserting the first line of the event path, the event path enters a meta-stable state four (100). In this meta-stable state, users read the data on the data path and acknowledge having read the data by asserting the second line EB1 of the event path and de-asserting the first line EB0 of the event path. When every user has read the data, the event path assumes the stable state of five (101), shown at time t4 in FIG. 6. From stable state five (101) a user placing data on the data path will assert the third line EB2 of the event path and de-assert the second line EB1 of the event path, shown at time t5 in FIG. 6, to urge the event path toward the next stable state three (011). However, since all of the other users are asserting the second line EB1 of the event path, the event path enters a meta-stable state one (001). In this meta-stable state, users read the data on the data path and acknowledge having read the data by asserting the third line EB2 of the event path and de-asserting the second line EB1 of the event path. When every user has read the data, the event path assumes the stable state of three (011), shown in FIG. 6 at time t6. Further transmission and reception of data among users cycles through these same states of the event path. As shown, for example, at times t7 and t8, the states of the event path repeat the states shown at t1 and t2, respectively. Whenever the event path assumes a meta-stable state, the users are thereby signalled that data is available to be read. Whenever the event path assumes a stable state, the users are thereby signalled that the data path is available for the transmission of data. If a fast user reads the event path a second time before all users have acknowledged receipt of the data and thus finds that the event path is in the same meta-stable state as the last time that it was read, there will be no ambiguity since if new data were available on the data path, a different meta-stable state would appear on the event path. Typically, the microprocessors 16, 18, 20 will have a memory-implemented state machine associated with the microprocessor in order to determine whether data is being received, and if so, what the value of the data is. Likewise, the microprocessor will typically utilize well-known line interface means for reading and driving the event and data paths.

The communications system described above with reference to FIGS. 4–6 may be used in a multi-user environment as shown, or may be used in a two user point-to-point environment. Moreover, while the system has been described with reference to a three conductor event path (state bus) and an n-conductor data path (n being an integer ≧1), the method of the system may be applied in a carrier based communication system with or without a wired connection among users.

Figure 7:
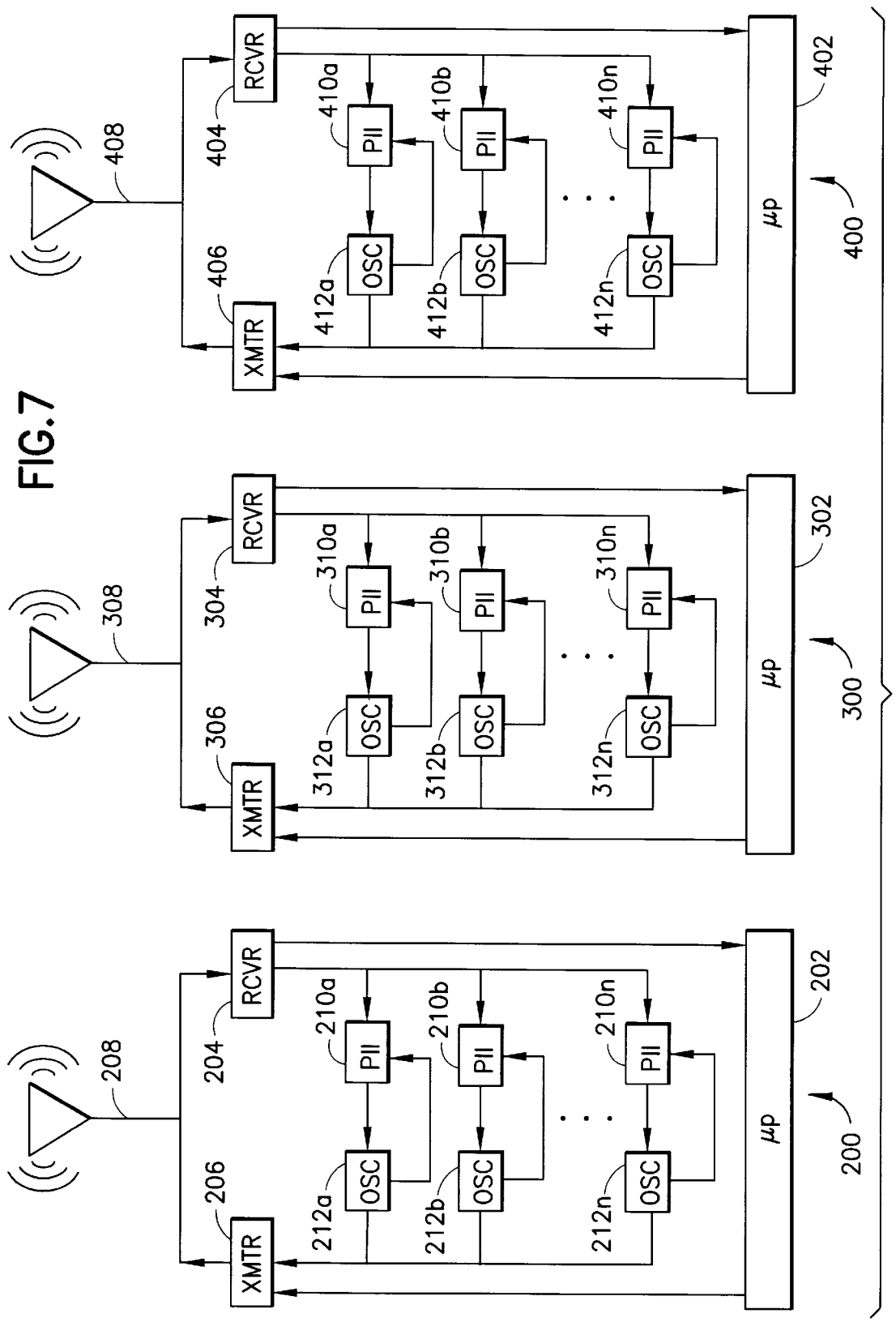
FIG. 7 is a schematic block diagram of a wireless communications system according to the invention.

Thus far the invention has been described as having physical conductors (data bus and event bus) coupling users. However, it will be appreciated that the communication among users is effected by signals which may be transmitted and received without physical conductors or via a single conductor. Turning now to FIG. 7, three wireless users 200, 300, 400 are shown. Each user is identical and similar reference numerals (one hundred removed from each other) refer to similar components of each user. With reference to user 200, e.g., each user includes a microprocessor 202 which is coupled to a receiver 204 and a transmitter 206. The input of the receiver 204 and the output of the transmitter 206 are coupled to an antenna 208 or another transmission medium such as a coaxial cable or a power line (not shown). The output of the receiver 204, in addition to being coupled to the microprocessor 202, is coupled to a plurality of phase locked loop circuits 210a, 210b, . . . , 210n, each of which controls a respective oscillator 212a, 212b, . . . , 212n. The input of the transmitter 206, in addition to being coupled to the microprocessor 202, is coupled to the output of each oscillator 212a, 212b, . . . , 212n.

Those skilled in the art will appreciate that the communications system described herein above is readily implemented among the users 200, 300, 400 by providing each user with the ability to send and receive three "event" signals and n-number of data signals where n≧1. More particularly, each user should be provided with at least four oscillators, three for generating event signals and one for generating data signals. It will be understood, however, that different numbers of oscillators can achieve substantially the same results. Several examples of methods of implementing the communication system are described below with Example 1 being the presently preferred method.

EXAMPLE 1

Coherent Pulse Keying

Each user is provided with the ability to transmit four particular frequencies and to receive the four particular frequencies. All users operate on the same frequencies. In addition, each user is provided with the ability to adjust the phase angle of its transmissions. The coherent system is preferably initialized with a routine whereby all the users adjust the phase angles of their transmissions. In particular, one user designated a master, will transmit each of the four frequencies while the other users adjust the phase of their transmissions of the respective frequencies to be in phase with the master. Depending on the physical nature of the system, the phase adjustment routine may be carried out periodically. For example, if one or more of the system users is mobile, phase adjustment may be performed at frequent intervals.

The signalling of events and data is accomplished by transmitting one or more of the four frequencies. For example, the event signals EB0, EB1, EB2 (FIG. 6) are asserted using three frequencies $f_{EB2}$, $f_{EB1}$, $f_{EB0}$. Data is transmitted using one frequency $f_{DAT}$ for each bit of data. It will be understood that the initial state of the communications system as described above with reference to FIGS. 5 and 6 is effected by each user transmitting frequency $f_{EB2}$. This represents the (011) state of the event path. Table 1, below, is an example of the (011) state of the event path in a three User system.

TABLE 1

| User | EB2 | EB1 | EB0 |
|---|---|---|---|
| 1 | $f_{EB2}$ | — | — |
| 2 | $f_{EB2}$ | — | — |
| 3 | $f_{EB2}$ | — | — |

The next meta-stable state (010) of the event path is indicated by the reception of the two frequencies $f_{EB0}$ and $f_{EB2}$, etc., and is accomplished by the data sending transmitter no longer sending frequency $f_{EB2}$, but sending frequency $f_{EB0}$. This state is illustrated by example in Table 2 below where User #1 is transmitting data and neither User #2, nor User #3 have acknowledged receipt of data.

TABLE 2

| User | EB2 | EB1 | EB0 |
|---|---|---|---|
| 1 | — | — | $f_{EB0}$ |
| 2 | $f_{EB2}$ | — | — |
| 3 | $f_{EB2}$ | — | — |

Upon receiving $f_{EB0}$, Users #2 and #3 stop transmitting the $f_{EB2}$ frequency and start transmitting the $f_{EB0}$ frequency. When all users are transmitting their $f_{EB0}$ frequency, the next stable state (110) is reached. Data is similarly transmitted wherein transmission of the frequency $f_{DAT}$ indicates a binary zero and the absence of that frequency indicates a binary one. It will be appreciated that the number of data frequencies may be increased so that multiple bits of data can be transmitted simultaneously.

From the foregoing it will be understood that in a stable state only one frequency will be present on the event path, and in a meta-stable state only two frequencies will be present on the event path. The advantage of this method is that a large number of users can be accommodated with an assignment of relatively few frequencies. However, unlike the method of Examples 2 and 4, described below, each user's identity is not immediately discernable via the identification of a frequency.

Figure 1:
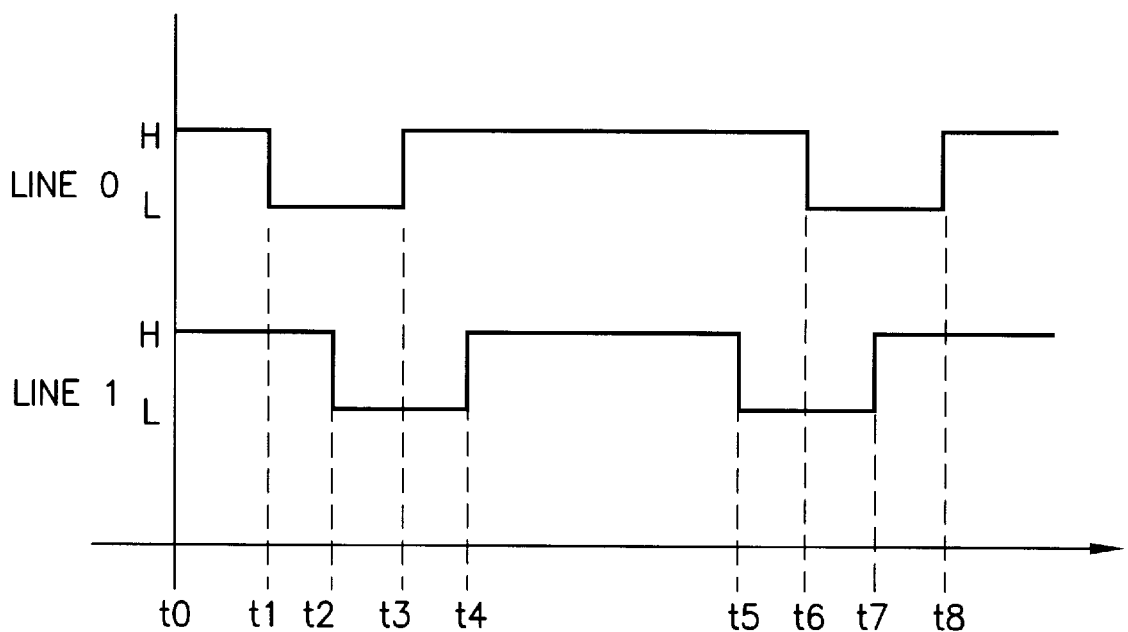
FIG. 1 is a timing diagram of a point-to-point serial data link according to the parent application.
Figure 2:
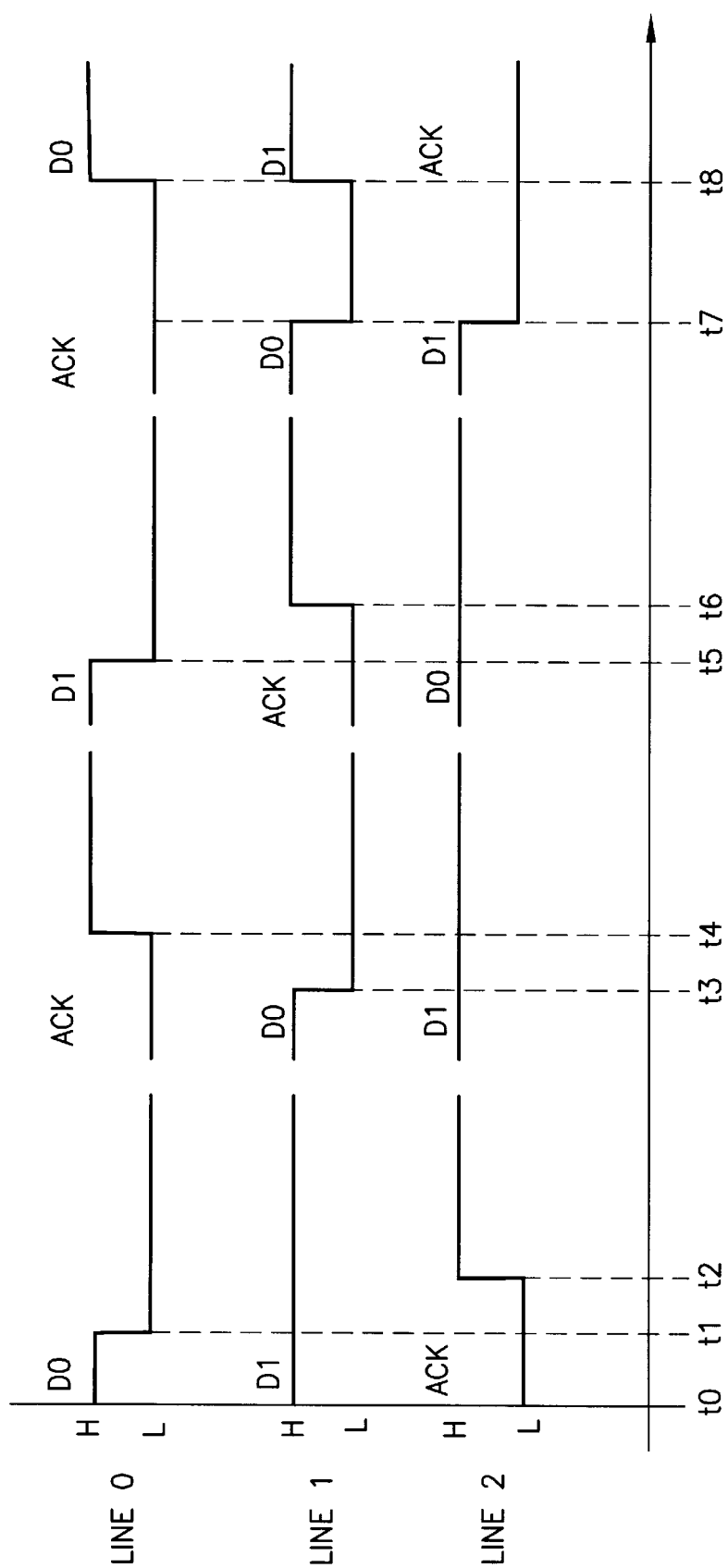
FIG. 2 is a timing diagram of a multi-user serial data bus according to the parent application.
Figure 3:
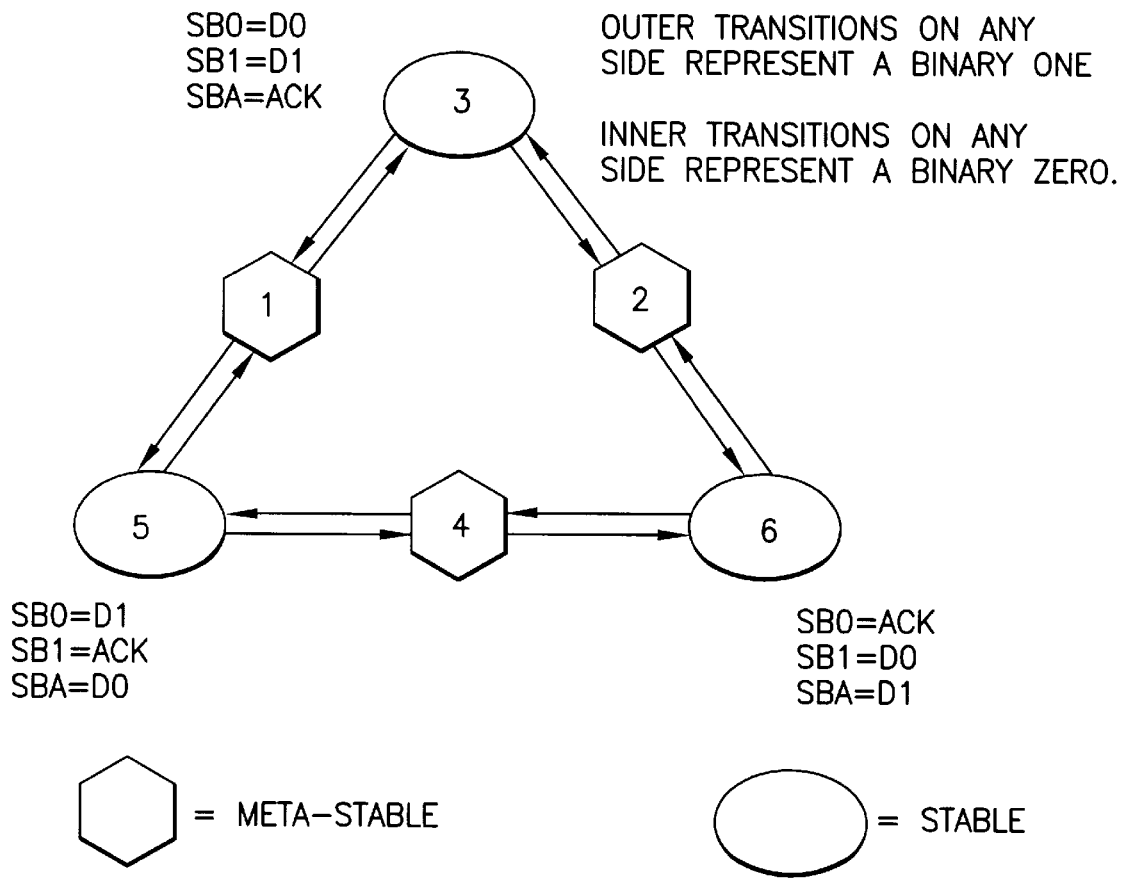
FIG. 3 is a state diagram of the multi-user serial data bus according to the parent application.

It should be appreciated that the described coherent phase keying technique may be viewed as a modem-type signalling wherein the three frequencies used to signal the event path are viewed as each representing a stable state rather than combined presence and/or absence of frequencies on the event path representing a binary three bit number which in turn represents a state. For example, the three frequencies may be viewed as. $f_{S3}$, $f_{S6}$, and $f_{S5}$, where each frequency represents one of the three stable states of the event path. The signalling of states is, therefore, an analog type signalling rather than the digital signalling described above. More particularly, when the system is reset, all users will transmit state frequency $f_{S3}$. A user will commence a transmission by discontinuing transmission of state frequency $f_{S3}$ and commencing transmission of state frequency $f_{S6}$. Other users will acknowledge the transmission by ceasing the transmission of state frequency $f_{S3}$ and commencing the transmission of state frequency $f_{S6}$. Whenever two different state frequencies are received by a user, it is understood that the event path is in a meta-stable state. Whenever all the users are transmitting the same state frequency, the event path is in a stable state. The states rotate, as shown in FIG. 3, from state 3, when all users transmit frequency $f_{S3}$, to state 6, when all users transmit frequency $f_{S6}$, to state 5, when all users transmit frequency $f_{S5}$. The meta-stable state 2, between stable states 3 and 6 is recognized when some users are transmitting frequency $f_{S3}$ and at least one user is transmitting frequency $f_{S6}$. The meta-stable state 4, between stable states 6 and 5 is recognized when some users are transmitting frequency $f_{S6}$ and at least one user is transmitting frequency $f_{S5}$. The meta-stable 1, between stable states 5 and 3 is recognized when some users are transmitting frequency $f_{S5}$ and at least one user is transmitting frequency $f_{S3}$.

The provided system may also be viewed as a multipoint modem network with peer-to-peer communication.

EXAMPLE 2

Non-Coherent FSK

Each user is provided with the ability to transmit at least eight frequencies and the ability to recognize n times the at least eight frequencies where n is the number of users transmitting in the system. The transmission of signals is effected using FSK techniques which are well known in the art. The event signals EB0, EB1, EB2 (FIG. 6) are transmitted by each user using six frequencies $f_{EB0(H)}$, $f_{EB0(L)}$, $f_{EB1(H)}$, $f_{EB1(L)}$, $f_{EB2(H)}$, $f_{EB2(L)}$. Data is transmitted by each user using at least two frequencies $f_{DAT(H)}$, $f_{DAT(L)}$. In this non-coherent system, each user transmits different frequencies. I.e. $f_{EB0(H)}$ for the first user will be a different frequency (e.g. $f_{EB0(H)1}$) than the $f_{EB0(H)}$ for the second user (e.g. $f_{EB0(H)2}$). The same is true for the other event signal frequencies and for the data signal frequencies. It will also be appreciated that the number of data frequencies may be increased so that multiple bits of data can be transmitted simultaneously.

With this in mind, it will be understood that the initial state of the communications system as described above with reference to FIGS. 5 and 6 is effected by each user transmitting its respective frequencies $f_{EB2(L)}$, $f_{EB1(H)}$, $f_{EB0(H)}$. This represents the (01) state of the event path. For example, in a system of three users, the (011) state of the event path will be represented by the transmission of nine different frequencies. In order to better understand the movement of the event path from stable to meta-stable states, reference will be made to Table 3 below which shows the three frequencies transmitted by each of three users.

TABLE 3

| User | EB2 | EB1 | EB0 |
| --- | --- | --- | --- |
| 1 | $f_{EB2(L)1}$ | $f_{EB1(H)1}$ | $f_{EB0(H)1}$ |
| 2 | $f_{EB2(L)2}$ | $f_{EB1(H)2}$ | $f_{EB0(H)2}$ |
| 3 | $f_{EB2(L)3}$ | $f_{EB1(H)3}$ | $f_{EB0(H)3}$ |

Upon sending data on the data path, the transmitting party will concurrently replace the frequency $f_{EB2(L)}$ with the frequency $f_{EB2(H)}$ and will replace the frequency $f_{EB0(H)}$ with $f_{EB0(L)}$. For example, in the case of three users as shown in Table 3, the state of the event path when User #1 sends data (and before any other user acknowledges receipt of the data is shown in Table 4 below.

TABLE 4

| User | EB2 | EB1 | EB0 |
| --- | --- | --- | --- |
| 1 | $f_{EB2(H)1}$ | $f_{EB1(H)1}$ | $f_{EB0(L)1}$ |
| 2 | $f_{EB2(L)2}$ | $f_{EB1(H)2}$ | $f_{EB0(H)2}$ |
| 3 | $f_{EB2(L)3}$ | $f_{EB1(H)3}$ | $f_{EB0(H)3}$ |

Table 4 represents a meta-stable state of the event path. However, it will be appreciated that in this example, one may observe two consecutive meta-stable states before reaching the next consecutive stable state. In particular, Table 4 shows the state of the event path when User #1 is transmitting data and neither User #2 nor User #3 has acknowledged. A second meta-stable state of the event path is shown in Table 5 below.

TABLE 5

| User | EB2 | EB1 | EB0 |
| --- | --- | --- | --- |
| 1 | $f_{EB2(H)1}$ | $f_{EB1(H)1}$ | $f_{EB0(L)1}$ |
| 2 | $f_{EB2(H)2}$ | $f_{EB1(H)2}$ | $f_{EB0(L)2}$ |
| 3 | $f_{EB2(L)3}$ | $f_{EB1(H)3}$ | $f_{EB0(H)3}$ |

Table 5 illustrates the state of the event path when User #1 is transmitting data, User #2 has acknowledged receipt of the data, but User #3 has not yet acknowledged receipt of the data. The state of the event path shown in Tables 4 and 5 may be considered to be two different consecutive meta-stable states, or they may be considered to be two different representations of the same meta-stable state. In other words, regardless of how many users have not yet acknowledged receipt of data, so long as the assertion of the respective bits EB2, EB1, and EB0 is not in agreement among all users, the event path is in a meta-stable state.

The next consecutive stable state of the event path is shown in Table 6 below.

TABLE 6

| User | EB2 | EB1 | EB0 |
| --- | --- | --- | --- |
| 1 | $f_{EB2(H)1}$ | $f_{EB1(H)1}$ | $f_{EB0(L)1}$ |
| 2 | $f_{EB2(H)2}$ | $f_{EB1(H)2}$ | $f_{EB0(L)2}$ |
| 3 | $f_{EB2(H)3}$ | $f_{EB1(H)3}$ | $f_{EB0(L)3}$ |

It will be appreciated that Table 6 shows the stable state referred to above as (110) and is indicated where all users. transmit EB2 and EB1 High and transmit EB0 Low. This is the state of the event path after both User #2 and User #3 have acknowledged receipt of the data transmitted by User #1. It will also be understood that in the system of this example, it is possible that the event path change from the state shown in Table 4 to the state shown in Table 6, bypassing the state shown in Table 5, if both User #2 and User #3 acknowledge receipt of the data simultaneously. In the event that Users do not acknowledge simultaneously, it will also be appreciated that in this system, the event path indicates not only that some users have not yet acknowledged receipt of data, but also indicates which users have not yet acknowledged receipt of data.

The non-coherent FSK method is referred to as being non-coherent because there is no phase synchronization among all the users and each user must operate on different frequencies from the other users in order to avoid interference such as beating of frequencies. An advantage of this method is that since each user operates on different frequencies, the identity of each user can be automatically known to the other users by identifying the frequencies. A potential shortcoming of this method is that as the number of users increases, an increasing number of frequencies must be allocated.

EXAMPLE 3

Coherent FSK

In coherent FSK, each user is provided with the ability to transmit at least eight particular frequencies and to receive the at least eight particular frequencies. All users operate on the same frequencies. In addition, each user is provided with the ability to adjust the phase angle of its transmissions. The coherent system is preferably initialized with a routine whereby all the users adjust the phase angles of their transmissions. In particular, one user designated a master, will transmit each of the at least eight frequencies while the other users adjust the phase of their transmissions of the respective frequencies to be in phase with the master. Depending on the physical nature of the system, the phase adjustment routine may be carried out periodically. For example, if one or more of the system users is mobile, phase adjustment may be performed at frequent intervals.

The signalling of events and data is accomplished in substantially the same manner as described in Example 2, except that all users will be using the same frequencies. Thus, in a stable state, only three frequencies will be present on the event path and in a meta-stable state only five frequencies will be present. In addition, since all of the users operate on the same frequencies, there is only one discernable meta-stable state between each stable state, even when some users have acknowledged and others have not. The advantage of this method is that a large number of users can be accommodated with an assignment of relatively few frequencies. However, unlike the method of Example 2, each user's identity is not immediately discernable via the identification of a frequency.

EXAMPLE 4

Non-Coherent Pulse Keying

Each user is provided with the ability to transmit unique four frequencies and the ability to receive n times four frequencies where n is the number of transmitting users. This method is similar to the method of Example 2 except that a binary value is determined by the presence or absence of a transmitted frequency and in that regard it is similar to the method of Example 1. For example, the event signals EB0, EB1, EB2 (FIG. 6) are asserted using three frequencies $f_{EB2}, f_{EB1}, f_{EB0}$. Data is transmitted using one frequency $f_{DAT}$ for each bit of data. It will be understood that the initial state of the communications system as described above with reference to FIGS. 5 and 6 is effected by each user transmitting its frequency $f_{EB2}$. This represents the (011) state of the event path. Table 7, below, is an example of the (011) state of the event path in a three User system.

TABLE 7

| User | EB2 | EB1 | EB0 |
|---|---|---|---|
| 1 | $f_{EB2(1)}$ | — | — |
| 2 | $f_{EB2(2)}$ | — | — |
| 3 | $f_{EB2(3)}$ | — | — |

The next meta-stable state (010) of the event path is indicated by the reception of. the two frequencies $f_{EB0}$ and $f_{EB2}$, etc., and is accomplished by the data sending transmitter no longer sending frequency $f_{EB2}$, but sending frequency $f_{EB0}$. This state is illustrated by example in Table 8 below where user 190 1 is transmitting data and neither User #2, nor User #3 have acknowledged receipt of data.

TABLE 8

| User | EB2 | EB1 | EB0 |
|---|---|---|---|
| 1 | — | — | $f_{EB0(1)}$ |
| 2 | $f_{EB2(2)}$ | — | — |
| 3 | $f_{EB2(3)}$ | — | — |

Upon receiving $f_{EB0(1)}$, Users #2 and #3 drop their respective $f_{EB2}$ frequency and start sending their respective $f_{EB0}$ frequency. When all users are transmitting their $f_{EB0}$ frequency, the next stable state (110) is reached. Data is similarly transmitted wherein transmission of the frequency $f_{DAT}$ indicates a binary zero and the absence of that frequency indicates a binary one. It will be appreciated that the number of data frequencies may be increased so that multiple bits of data can be transmitted simultaneously. This method is referred to as being non-coherent because there is no reference signal common to all the users and each user must operate on different frequencies from the other users in order to avoid interference such as beating of frequencies. An advantage of this method is that the identity of each user can be automatically known to the other users by identifying the frequencies, since each user operates on different frequencies. A potential shortcoming of this method is that as the number of users increases, an increasing number of frequencies must be allocated. However, this method requires only half the number of event signalling frequencies as the method of Example 2, i.e. three event signalling frequencies as compared to six event signalling frequencies. Moreover, in this method the number of frequencies present on the event path at any time is always equal to the number of users, whereas in the method of Example 2, the number of frequencies on the event path at any given time is always equal to three times the number of users.

As suggested above, the communications system according to the invention is easily implemented in software using a microprocessor to read the event path and the data path. Exemplary software implementations are set out in Appendix A and Appendix B attached hereto. Appendix A illustrates a "C" code software implementation of a serial data path and a three bit wide event path. Appendix B illustrates a "C" code software implementation of an 8-bit parallel data path and a three bit wide event path.

Referring generally now to Appendix A, the stable states of a three bit event bus are defined as ALPHA, BETA, and GAMMA and these are indicated by the integer value of the event bus being three, six, and five, respectively. Metastable states of the event bus are defined as ALPHABETA, BETAGAMMA, and GAMMAALPHA and these are indicated by the integer value of the event bus being two, four, and one, respectively. The software defines the state of the event bus asserted by "this processor" as "CurrentState" which can only be a stable state. That is, "CurrentState" is the state of the event bus asserted by the processor running the software. A character receiver "objBusRx( )" is set up to return one character "RxByte" after receiving eight bits on the serial data bus and to return a value of −1 in the event of a reset. The software initializes "RxByte" and "numBits" (a bit counter used by the character receiver) to zero and reads the state of the event bus into the variable "busState". A processor specific function "readEventBus( )" is used to read whatever pins of the processor are chosen to be used for the event bus.

If "busstate" is zero or seven, a reset condition exists and the software resets "RxByte" and "numBits" to zero, sets "busState" to ALPHA (three), and "objBusRx( )" returns "−1".

The event bus is continually read and "busState" is compared to "CurrentState" to determine whether the state of the bus is different from the state asserted by "this processor". If the states differ, "busState" is compared to the state previous to the "CurrentState" to determine if new data is available or if the bus is being held in the previous state by a slow bus user. When it is determined that new data is available, one bit from the serial bus is shifted in to "RxByte", "numBits" is incremented, and CurrentState is incremented to the next stable state. If it is determined that the state of the bus is a different but non-adjacent state to the CurrentState, an error condition arises and an error handler is called. After a byte is returned, "RxByte" and "numBits" are set to zero.

A transmitter routine "objBusTx( )" is set up to transmit a character (byte). In conjunction with the transmitter, a count down "timer" is used and the bit counter "numBits" is also utilized. The "timer" is initially set a time out value and the bit counter is initially set to zero. The transmitter "objBusTx( )" will return a timeout code (1) if the "timer" zeros out before the state of the event bus indicates data is received by all users. The transmitter "objBusTx( )" will return a confirmation code (0) if all bus users confirm receipt of data before timeout.

The transmission proceeds by reading in bits one at a time from a character to be transmitted. For each bit, the DATAPIN of the processor is set to the appropriate value (0 or 1), the bit counter is incremented, the CurrentState is incremented to the next stable state, the nest bit of the character is shifted in for transmission, and the "timer" is started. The event bus is asserted to.the next stable state and is read continuously until it is the same state as the CurrentState. If the timer times out before the event bus is equal to the CurrentState, a timeout error is returned. Depending on the application, the timeout error can be used to call an error handler, reset the bus, or perform any other suitable routine. Barring an error, transmission continues until all eight bits have been transmitted.

Referring now generally to Appendix B, a parallel data bus implementation of the system of the invention is similar to the serial bus implementation described above with regard to reading and asserting the event bus. The only significant difference between the code in Appendix A and the code in Appendix B is that data is received and transmitted one byte at a time instead of one bit at a time.

There havesbeen described and illustrated herein several embodiments of high speed data communication apparatus and methods. While particular embodiments of the invention have been described, it is not intended that the invention be limited thereto, as it is intended that the invention be as broad in scope as the art will allow and that the specification be read likewise. Thus, while particular states of the event path have been disclosed, it will be appreciated that other states could be utilized. It is sufficient that the event path exhibit six sequential states in which three stable states are separated by three intervening meta-stable states. Also, while particular wired and wireless transmission media have been shown, it will be recognized that other types of transmission media could be used with similar results obtained. For example, fiber optic, sonic, microwave, RF, and other transmission media could be used. In addition, if desired, a hybrid wired/wireless system could be utilized wherein some signals are carried on a wire and others are transmitted without a wire. Moreover, while particular configurations have been disclosed in reference to the width of the event.path and the data path, it will be appreciated that other configurations could be used as well. In particular, the serial bus and link of the parent application may be advantageously embodied using any of the wireless transmission schemes disclosed herein. Furthermore, while the users of the communication system has been disclosed as having particular hardware configurations, it will be understood that different hardware configurations can achieve the same or similar function as disclosed herein with regard to the methods of the invention. It will therefore be appreciated by those skilled in the art that yet other modifications could be made to the provided invention without deviating from its spirit and scope as so claimed.

APPENDIX A

"C" Code Implementation of ObjectBus

Implementation 1 — Event Bus with Single Serial Data Line

```
#define ALPHA 3
#define ALPHABETA (ALPHA & BETA)
#define BETA 6
#define BETAGAMMA (BETA & GAMMA)
#define GAMMA 5
#define GAMMAALPHA (GAMMA & ALPHA)
//Define global CurrentState as the current state of THIS device's bus
//tracking logic..
int CurrentState; //Note this can only adopt STABLE states.
/************/
char objBusRx(){
/************/
        //This ObjectBus receiver returns a char after receiving 8 bits of data
        //on a seperate data line.
    //A return value of -1 indicates a reset.
    int busState,numBits,RxByte;
    RxByte=numBits=0;
    do{
        busState = readEventBus();
        //"readEventBus()" is a processor specific function that reads the
        //state of the bus from whatever pins of the micro are used to
        //implement the hardware connection.
        if((busState==0) || (busState==7)){
            //Detected reset condition;
            numBits=0;
            busState=ALPHA;
            RxByte=0;
            return -1;
        }
        if(busState != CurrentState){
            //If these states are not equal then either we are in a new or old
            //meta-stable state. Compute the old meta-state and compare.
            switch(CurrentState){
                case ALPHA:
```

APPENDIX A-continued

"C" Code Implementation of ObjectBus

```
                    if(busState==GAMMAALPHA){
                        //"Old" state , still waiting for slow peripheral.
                        break;
                    }
                    else{
                    if(busState==ALPHABETA){
                        //New data available. Update internal state and clk in data.
                        if(DATAPIN==0)
                            RxByte*=2;      //Shift in a zero
                        else
                            RxByte = 2*RxByte+1;    //Shift in a one.
                        CurrentState = BETA;
                        numBits++;
                    }
                    else{
                        //If neither of the above then an error has occurred.
                        errorHandler();
                    }
                }
                case BETA:
                    if(busState==ALPHABETA){
                        //"Old" state , still waiting for slow peripheral.
                        break;
                    }
                    else{
                    if(busState==BETAGAMMA){
                        //New data available. Update internal state and clk in data.
                        if(DATAPIN==0)
                            RxByte*=2;      //Shift in a zero
                        else
                            RxByte = 2*RxByte+1;    //Shift in a one.
                        CurrentState = GAMMA;
                        numBits++;
                    }
                    else{
                        //If neither of the above then an error has occurred.
                        errorHandler();
                    }
                }
                case GAMMA:
                    if(busState==BETAGAMMA){
                        //"Old" state , still waiting for slow peripheral.
                        break;
                    }
                    else{
                    if(busState==GAMMAALPHA){
                        //New data available. Update internal state and clk in data.
                        if(DATAPIN==0)
                            RxByte*=2;      //Shift in a zero
                        else
                            RxByte = 2*RxByte+1;    //Shift in a one.
                        CurrentState = ALPHA;
                        numBits++;
                    }
                    else{
                        //If neither of the above then an error has occurred.
                        errorHandler();
                    }
                }
            }
        }
    }while numBits<8;
    return RxByte;
}
/******************/
int objBusTx(char c){
/******************/
    //ObjectBus transmitter routine to send char c in SERIAL
    //manner along the data line. Return codes from the function
    //are as follows:
    //      Return Code     Meaning
    //          0           Char sent OK
    //          1           Timeout on transmission.
    int numBits;
```

APPENDIX A-continued

"C" Code Implementation of ObjectBus

```
        int timer=0xFFFF;    //set to whatever time out required.
        numBits = 0;
        do{
            if(c&0x80){
                //Send a ONE on the serial data line.
                DATAPIN = 1;
            }
            else{
                //Send a ZERO on the serial data line.
                DATAPIN = 0;
            }
            numBits++;
            c<<=1;      //Rotate that char to tx'd
            //Now that data is set up move to the next state
            //on the Event Bus.
            switch(CurrentState){
                case ALPHA:
                    CurrentState=BETA;
                    writeEventBus(BETA);    //processor specific function
                    while(readEventBus != BETA){
                        if(——timer==0){
                            return(1);    //Timeout error on bus.
                        }
                    }
                case BETA:
                    CurrentState=GAMMA;
                    writeEventBus(GAMMA);    //processor specific function
                    while(readEventBus != GAMMA){
                        if(——timer==0){
                            return(1);    //Timeout error on bus.
                        }
                    }
                case GAMMA:
                    CurrentState=ALPHA;
                    writeEventBus(ALPHA);    //processor specific function
                    while(readEventBus != ALPHA){
                        if(——timer==0){
                            return(1);    //Timeout error on bus.
                        }
                    }
            }
        }while numBits<8;
}
Implementation 2 — Event Bus with 8 bit Parallel Data Bus.

/******************/
char objBusRx(){
/******************/
    //This ObjectBus receiver gets a char each read.
    //a return value of ZERO indicates no new data.
    //a return value of -1 indicates a bus reset.
    int busState;
    char RxByte;
    busState = readEventBus();
    RxByte=0;
    //"readEventBus()" is a processor specific function that reads the
    //state of the bus from whatever pins of the micro are used to
    //implement the hardware connection.
    if((busState==0) || (busState==7)){
        //Detected reset condition;
        busState=ALPHA;
        return -1;
    }
    if(busState != CurrentState){
        //If these states are not equal then either we are in a new or old
        //meta-stable state. Compute the old meta-state and compare.
        switch(CurrentState){
            case ALPHA:
                if(busState==GAMMAALPHA){
                    //"Old" state , still waiting for slow peripheral.
                    break;
                }
                else{
                    if(busState==ALPHABETA){
                        //New data available. Update internal state and clk in
data.
                        RxByte=readDataBus();//Processor specific function
```

APPENDIX A-continued

"C" Code Implementation of ObjectBus

```
                        //to read 8 bit data bus.
                        CurrentState = BETA;
                    }
                    else{
                        //If neither of the above then an error has occurred.
                        errorHandler();
                    }
                }
            case BETA:
                if(busState==ALPHABETA){
                    //"Old" state , still waiting for slow peripheral.
                    break;
                }
                else{
                    if(busState==BETAGAMMA){
                        //New data available. Update internal state and clk in
data.
                        RxByte = readDataBus();
                        CurrentState = GAMMA;
                    }
                    else{
                        //If neither of the above then an error has occurred.
                        errorHandler();
                    }
                }
            case GAMMA:
                if(busState==BETAGAMMA){
                    //"Old" state , still waiting for slow peripheral.
                    break;
                }
                else{
                    if(busState==GAMMAALPHA){
                        //New data available. Update internal state and clk in
data.
                        RxByte = readDataBus();
                        CurrentState = ALPHA;
                        numBits++;
                    }
                    else{
                        //If neither of the above then an error has occurred.
                        errorHandler();
                    }
                }
        }
    }
    return RxByte;
}
/******************/
int objBusTx(char c){
/******************/
    //ObjectBus transmitter routine to send char c in PARALLEL
    //manner along the data line. Return codes from the function
    //are as follows:
    //     Return Code   Meaning
    //         0         Char sent OK
    //        -1         Timeout on transmission.
    int timer=0xFFFF;    //set to whatever time out required.
    writeDataBus(c);     //the entire byte is written to data bus.
    //Now that data is set up move to the next state
    //on the Event Bus.
    switch(CurrentState){
        case ALPHA:
            CurrentState=BETA;
            writeEventBus(BETA);    //processor specific function
            while(readEventBus != BETA){
                if(——timer==0){
                    return(-1);    //Timeout error on bus.
                }
            }
        case BETA:
            CurrentState=GAMMA;
            writeEventBus(GAMMA);    //processor specific function
            while(readEventBus != GAMMA){
                if(——timer==0){
                    return(-1);    //Timeout error on bus.
```

APPENDIX A-continued

"C" Code Implementation of ObjectBus

```
        }
    }
    case GAMMA:
    CurrentState=ALPHA;
    writeEventBus(ALPHA);      //processor specific function
    while(readEventBus != ALPHA){
        if(——timer==0){
            return(-1);        //Timeout error on bus.
        }
    }
  }
}
```

I claim:

1. A data communication system comprising:
a) an N-bit data path, N being an integer ≧1;
b) an event path having at least three stable states;
c) a first system user coupled to said data path and said event path,
said first system user having means for asserting each of said three stable states of said event path, means for reading the state of said event path, means for placing N-bits of data on said data path, and means for reading N-bits of data from said data path;
d) a second system user coupled to said data path and said event path,
said second system user having means for asserting each of said three stable states of said event path, means for reading the state of said event path, means for placing N-bits of data on said data path, and means for reading N-bits of data from said data path, wherein
prior to data communication between said first and second system users, both said first and second system users assert an identical first state of said event path,
when said first system user places a first N-bits of data on said data path, said first system user asserts a second state of said event path and de-asserts said first state of said event path,
when said second system user reads said first N-bits of data on said data path, said second system user asserts said second state of said event path and de-asserts said first state of said event path;
when one of said first and second system users places a second N-bits of data on said data path, that system user de-asserts said second state of said event path and asserts a third state of said event path, and
when the other system user reads said second N-bits of data on said data path, said other system user de-asserts said second state of said event path and asserts said third state of said event path.

2. A data communication system according to claim 1, further comprising:
e) a third system user coupled to said data path and said event path,
said third system user having means for asserting each of said three stable states of said event path, means for reading the state of said event path, means for placing N-bits of data on said data path, and means for reading N-bits of data from said data path, wherein
prior to data communication between said first system user and said third system user, said third system user asserts said first state of said event path, when said third system user reads said first N-bits of data on said data path,.said third system user asserts said second state of said event path and de-asserts said first state of said event path; and
when said third system user reads said second N-bits of data on said data path, said third system user de-asserts said second state of said event path and asserts said third state of said event path.

3. A data communication system according to claim 1, wherein:
said event path is a three-bit path and each of said stable states is asserted by asserting a different bit of said three bit path.

4. A data communications system according to claim 1, wherein:
said event path has three meta-stable states in addition to said three stable states, said meta-stable states occurring when one system user asserts one stable state and another system user asserts a different stable state.

5. A data communications system according to claim 1, wherein:
said N-bit data path is a physical bus, and
said event path is a physical bus.

6. A data communication system according to claim 1, wherein:
said N-bit data path is a wireless channel,
said event path is a wireless channel,
said means.for asserting includes FSK signalling means, and
said means for placing includes FSK signalling means.

7. A data communication system according to claim 6, wherein:
at least one of said first system user and said second system user has means for adjusting the phase of said FSK signalling means so that said first and second system users transmit signals in phase with each other.

8. A data communication system according to claim 1, wherein:
said N-bit data path is a wireless channel,
said event path is a wireless channel,
said means for asserting includes frequency transmission means, and
said means for placing includes frequency transmission means.

9. A data communication system according to claim 8, wherein:
at least one of said first system user and said second system user has means for adjusting the phase of said frequency transmission means so that said first and second system users transmit frequencies in phase with each other.

10. A data communications system according to claim 1, wherein:
said event path has a reset state in addition to said three stable states.

11. A data communication system, comprising:
a) a N-bit data path;
b) an event path having at least six sequential states;
c) a first system user coupled to said data path and said event path, said first system user having means for placing N-bits of data on said data path, means for reading N-bits of data from said data path, and means for changing the state of said event path;
d) a second system user coupled to said data path and said event path, said second system user having means for placing N-bits of data on said data path, means for reading N-bits of data from said data path, and means for changing the state of said event path, wherein said first system user changes the state of said event path when said first system user places a first N-bits of data on said data path, and said second system user changes the state of said event path when said second system user reads said first N-bits of data on said data path.

12. A data communications system according to claim 11, further comprising:

e) a third system user coupled to said data path and said event path, said third system user having means for placing N-bits of data on said data path, means for reading N-bits of data from said data path, and means for changing the state of said event path, wherein said third system user changes the state of said event path when said third system user places a second N-bits of data on said data path.

13. A method of transferring data from a first system user to a second system user via a communications link, said method comprising:

a) said first system user and said second system user both transmit a first state signal;

b) said first system user transmits a first N-bits of data and contemporaneously stops transmitting said first state signal and transmits a second state signal;

c) said second system user stops transmitting said first state signal and transmits said second state signal as acknowledgement of receipt of said first N-bits of data;

d) said first system user transmits a second N-bits of data and contemporaneously stops transmitting said second state signal and transmits a third state signal; and e) said second system user stops transmitting said second state signal and transmits said third state signal as acknowledgement of receipt of said second N-bits of data.

14. A method according to claim 13, further comprising:

f) said first system user transmits a third N-bits of data and contemporaneously stops transmitting said third state signal and transmits said first state signal; and g) said second system user stops transmitting said third state signal and transmits said first state signal as acknowledgement of receipt of said third N-bits of data.

15. A data communications system comprising:

a) a first system user having first means for signalling a binary ZERO and first means for signalling a binary ONE;

b) a second system user having second means for signalling a binary ZERO and second means for signalling a binary ONE;

c) a communications link coupling said first system user and said second system user, wherein when said first means for signalling a binary ZERO signals a binary ZERO, said second means for signalling a binary ONE signals a binary ONE as acknowledgement, when said first means for signalling a binary ONE signals a binary ONE, said second means for signalling a binary ZERO signals a binary ZERO as acknowledgement, wherein said communications link is one of a carrier based link and a wireless link.

16. A data communications system according to claim 15, wherein:

at least one of said first means for signalling a binary ZERO and said first means for signalling a binary ONE includes frequency generator means, and at least one of said second means for signalling a binary ZERO and said second means for signalling a binary ONE includes frequency generator means.

17. A method of transferring data from a first system user to a second system user via a serial link, said method comprising:

a) said first system user transmitting a first bit of data to said second system user;

b) said first system user waiting for acknowledgement of said first bit;

c) said second system user transmitting an acknowledgement of said first bit to said first system user; and d) after receipt of said acknowledgement from said second system user, said first system user transmitting a second bit of data to said second system user, wherein said acknowledaement is a bit having a value which is predefined relative to the first bit of data and wherein communication proceeds bit by bit with each transmitted bit of data being acknowledged with a bit having a predefined value relative to the transmitted bit.

* * * * *